(12) United States Patent
Lee

(10) Patent No.: US 10,794,248 B2
(45) Date of Patent: Oct. 6, 2020

(54) EXHAUST GAS PURIFYING APPARATUS OF VEHICLE

(71) Applicants: HYUNDAI MOTOR COMPANY, Seoul (KR); KIA MOTORS CORPORATION, Seoul (KR)

(72) Inventor: Sang Min Lee, Suwon-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 177 days.

(21) Appl. No.: 16/196,933

(22) Filed: Nov. 20, 2018

(65) Prior Publication Data
US 2020/0003095 A1    Jan. 2, 2020

(30) Foreign Application Priority Data

Jun. 27, 2018 (KR) .................. 10-2018-0073734

(51) Int. Cl.
| | |
|---|---|
| *F01N 3/02* | (2006.01) |
| *F01N 3/033* | (2006.01) |
| *F01D 25/24* | (2006.01) |
| *F02C 6/12* | (2006.01) |
| *B01D 46/00* | (2006.01) |
| *F01N 3/021* | (2006.01) |

(52) U.S. Cl.
CPC .......... *F01N 3/033* (2013.01); *B01D 46/0005* (2013.01); *F01D 25/243* (2013.01); *F01N 3/021* (2013.01); *F02C 6/12* (2013.01); *F01N 2350/00* (2013.01); *F05D 2220/40* (2013.01)

(58) Field of Classification Search
CPC ........ F01N 3/02; F01N 3/021; B01D 46/0005
See application file for complete search history.

(56) References Cited

U.S. PATENT DOCUMENTS 8,539,767 B2 * 9/2013 O'Kane .............. F01N 13/1805
60/602

FOREIGN PATENT DOCUMENTS

KR    10-2017-0119843 A    10/2017

\* cited by examiner

*Primary Examiner* — Robert A Hopkins
(74) *Attorney, Agent, or Firm* — Morgan, Lewis & Bockius LLP

(57) ABSTRACT

An exhaust gas purifying apparatus for a vehicle includes: a turbocharger having a turbine which rotates by exhaust gas flowing from an engine into an inlet of the turbine; a filter connected to an outlet of the turbine at an inlet of the filter and allowing the exhaust gas passing through the turbine to flow into the filter; and a gasket disposed between the outlet of the turbine and the inlet of the filter to maintain airtightness between the turbine and the filter. A portion of the gasket is exposed toward the turbine or the filter.

9 Claims, 5 Drawing Sheets

[FIG. 1]
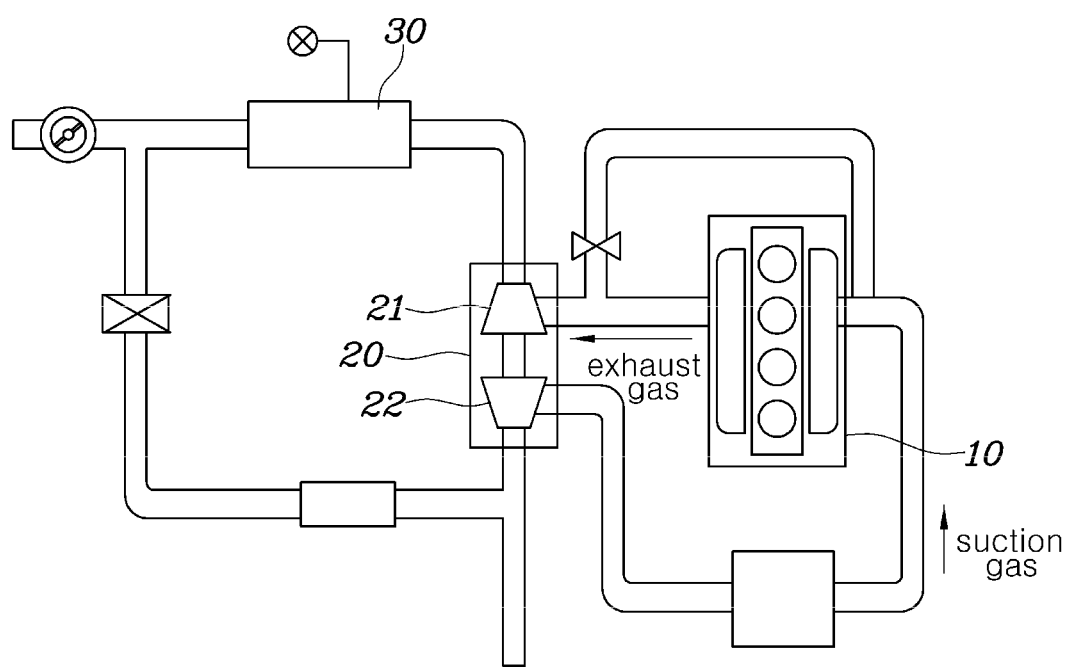
- PRIOR ART -

[FIG. 2]
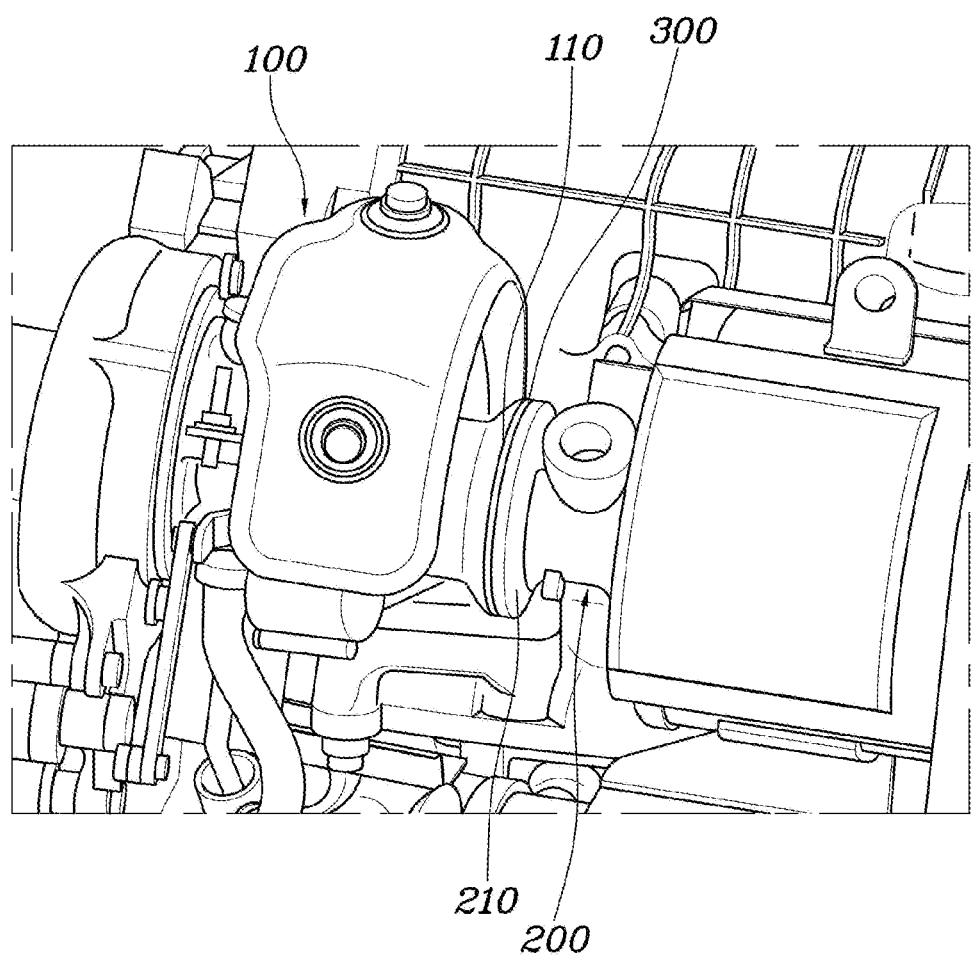

[FIG. 3]
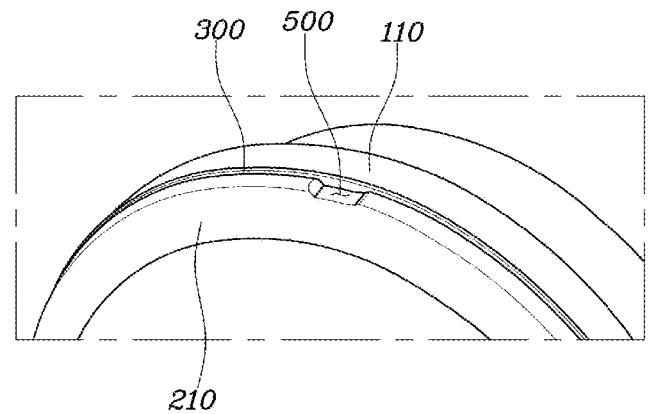
[FIG. 4]
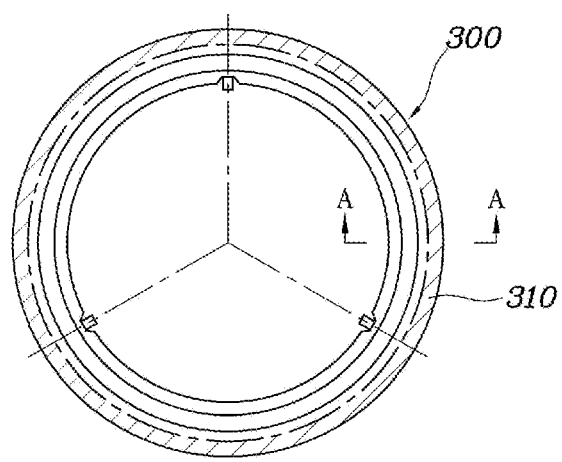
[FIG. 5]
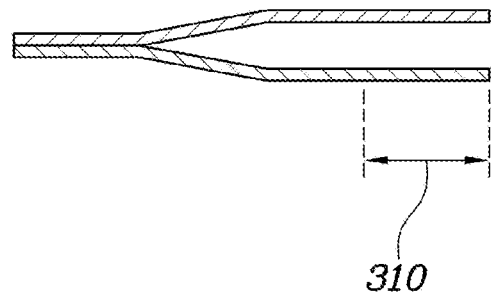

[FIG. 6]
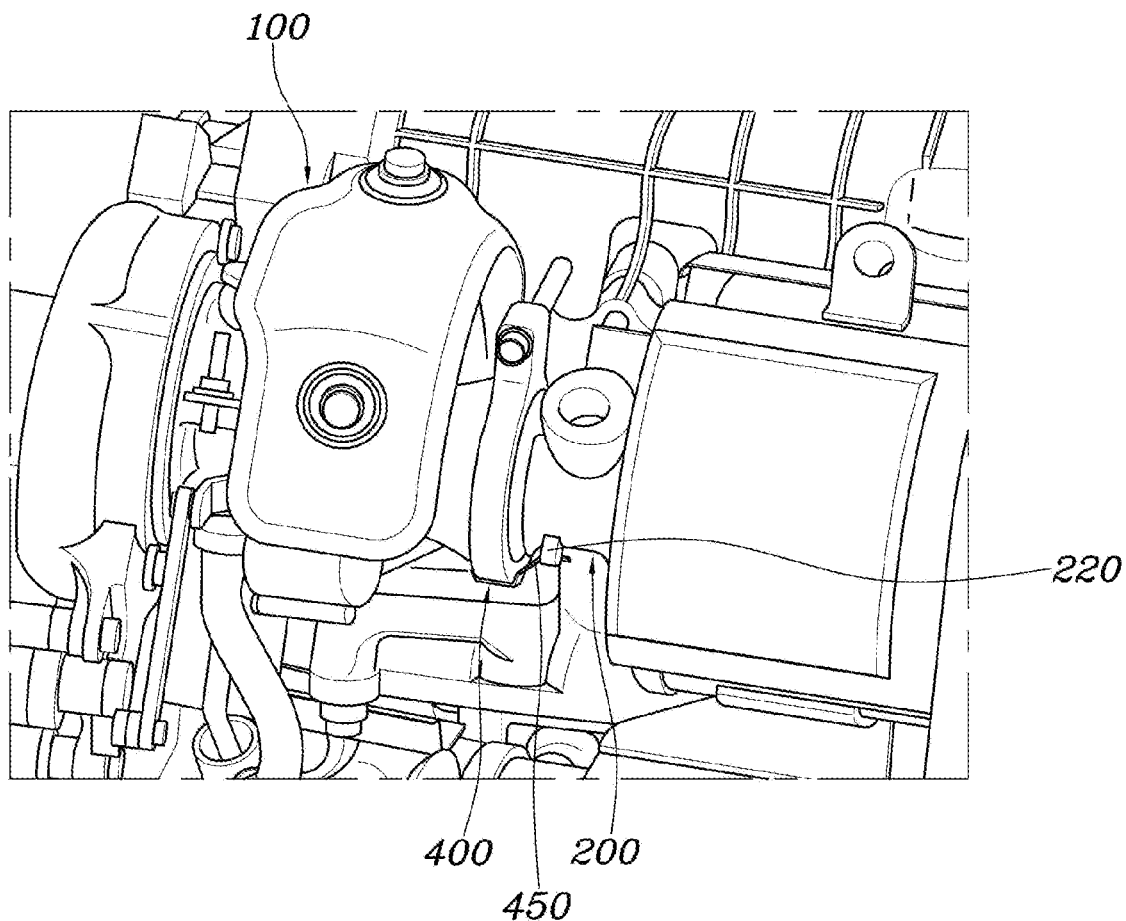

[FIG. 7]
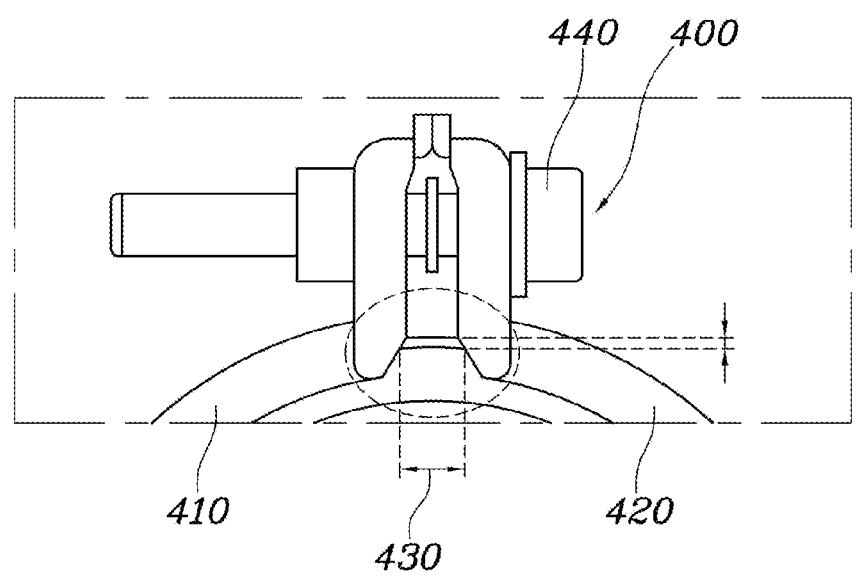

EXHAUST GAS PURIFYING APPARATUS OF VEHICLE

CROSS REFERENCE TO RELATED APPLICATION

The present application claims priority of Korean Patent Application No. 10-2018-0073734 filed on Jun. 27, 2018, the entire contents of which is incorporated herein for all purposes by this reference.

TECHNICAL FILED

The present disclosure relates to an exhaust gas purifying apparatus for a vehicle, and more particularly, to an exhaust gas purifying apparatus in which a gasket included in a connecting part connecting a turbine of a turbocharger and a filter is exposed.

BACKGROUND

Diesel engines are more fuel efficiency and have better output over other internal combustion engines; however, there are strict regulations on the generation of particular matter. Accordingly, in order to reduce environmental pollutants contained in the particular matter, a post-treatment device has been applied to a vehicle, and a diesel oxidation catalyst (DOC) and a diesel particulate filter (DPF) have been commonly utilized as the post-treatment device. In addition to the above device, a selective catalytic reduction (SCR) device has been recently developed.

The diesel particulate filter is a device which collects particular matter, accumulates a certain amount of particular matter, and then raises an exhaust temperature through a post-injection of particular matter, thereby burning accumulated particular matter.

In addition, an exhaust gas recirculation (EGR) system for driving a turbocharger and recirculating exhaust gas is applied to a diesel engine, and this system is configured to be associated with an exhaust system equipped with the conventional diesel particulate filter.

FIG. 1 is a view illustrating a configuration of an exhaust gas purifying apparatus according to the prior art.

Referring to FIG. 1, a turbocharger 20 includes a compressor 22 and a turbine 21 connected to an intake port and an exhaust port of an engine 10, respectively. Particularly, in the turbine 21 included in the turbocharger 20, exhaust gas discharged from the engine 10 flows into an inlet to rotate the turbine, and an outlet is connected to a post-treatment device 30.

A gasket, which is a packing used for maintaining airtightness, should be inserted between the outlet of the turbine 21 and an inlet of the post-treatment device 30 to prevent filling material, gas or cooling water from being leaked.

However, there is a problem that it is difficult to confirm whether the gasket is inserted in the step in which an assembling process of the engine 10 to which the turbine 21 and the post-treatment device 30 were coupled is completed, and thus when the gasket is erroneously omitted, leakage of the exhaust gas may occur.

It should be understood that the foregoing is intended merely to aid in the understanding of the background of the present disclosure, and is not intended to mean that the present disclosure falls within the purview of the related art that is already known to those skilled in the art.

SUMMARY OF THE DISCLOSURE

The present disclosure is devised to solve the above-mentioned problems, and it is an object of the present disclosure to provide an exhaust gas purifying apparatus in which a portion of a gasket placed between a turbine and a post-treatment device may be exposed through a gap formed in a clamp to confirm whether the gasket exists even after assembling the components.

In order to achieve the above object, an exhaust gas purifying apparatus for a vehicle according to an exemplary embodiment of the present disclosure may include: a turbocharger having a turbine which rotates by exhaust gas flowing from an engine into an inlet of the turbine; a filter connected to an outlet of the turbine at an inlet of the filter and allowing the exhaust gas passing through the turbine to flow into the filter; and a gasket disposed between the outlet of the turbine and the inlet of the filter to maintain airtightness between the turbine and the filter. A portion of the gasket may be exposed toward the turbine or the filter.

Flanges may be formed at the outlet of the turbine and the inlet of the filter, respectively, and the flange of the turbine and the flange of the filter are connected to each other. Also, a portion of one of the flange of the turbine and the flange of the filter may be concave towards an inner side thereof, so as to allow a portion of the gasket to be exposed.

A portion of one face of the gasket, which is in contact with the flange in which a portion is concaved towards the inner side thereof, may be painted.

The painted portion of the gasket may be formed to have a width at an edge of the gasket, that is equal to or greater than a depth of a portion of the flange which is concaved towards the inner side thereof.

The exhaust gas purifying apparatus for a vehicle according to the present disclosure may further include a fastening device configured to have a shape wrapping the outlet of the turbine, the inlet of the filter and only a portion of the gasket between the turbine and the filter, and to fasten the turbine and the filter.

The fastening device may include a first part configured to cover a portion of the outlet of the turbine and the inlet of the filter and a second part configured to cover the other portion of the outlet of the turbine and the inlet of the filter. Here, the first part and the second part may be coupled to each other such that a gap through which the outlet of the turbine and the inlet of the filter are exposed to the outside is formed therebetween.

The fastening device may be fixed to allow the gap to be positioned at a portion of the gasket, which is exposed to the turbine side or the filter side.

The fastening device, and one of the turbine and the filter may have a fixing means formed thereon, respectively, to fix a position of the fastening device.

The fixing means may include a first protrusion formed to protrude outward from one of the turbine and the filter and a second protrusion formed to protrude from the fastening device towards one of the turbine and the filter, and the first protrusion and the second protrusion may be engaged with and coupled to each other.

BRIEF DESCRIPTION OF THE DRAWINGS

The above and other objects, features and advantages of the present disclosure will be more clearly understood from the following detailed description taken in conjunction with the accompanying drawings, in which:

FIG. 1 is a view illustrating a configuration of an exhaust gas purifying apparatus according to the prior art;

FIG. 2 is a view illustrating an exhaust gas purifying apparatus of a vehicle to which a fastening device according to one embodiment of the present disclosure is not coupled;

FIG. 3 is a perspective view showing a state in which a flange of a turbine and a flange of a filter according to one embodiment of the present disclosure are coupled to each other;

FIG. 4 is a plane view of a gasket according to one embodiment of the present disclosure;

FIG. 5 is a cross sectional view taken along line A-A in FIG. 4;

FIG. 6 is a view illustrating the exhaust gas purifying apparatus of a vehicle to which the fastening device according to one embodiment of the present disclosure is coupled; and FIG. 7 is an enlarged view of the fastening device according to one embodiment of the present disclosure.

DETAILED DESCRIPTION

Specific structural and functional descriptions of the embodiments of the present disclosure disclosed in this specification or application are only for the purpose of illustrating embodiments according to the present disclosure, and the embodiments according to the present disclosure may be embodied in various forms and should not be interpreted as being limited to the embodiments described in this specification or the application.

While the present disclosure is susceptible to various modifications and may have a variety of embodiments, specific embodiments thereof will be illustrated by way of example in the drawings and described in detail in the detail description. It is to be understood, however, that the present disclosure is not intended to be limited to the particular embodiments, but includes all modifications, equivalents, and alternatives falling within the spirit and scope of the present disclosure.

The terms "first", "second", etc. may be used to describe various components, but the components should not be limited by those terms. The above terms are used merely for the purpose to distinguish a component from the other component. For example, a first component may be named a second component, and similarly, a second component may be named a first component without departing from the scope of right of the disclosure.

It should be understood that when any component is referred to as being "connected" or "coupled" to another component, the component may be directly connected or coupled to another component, but any intervening component may be present between these components. In contrast, it should be understood that when any component is referred to as being "directly connected" or "directly coupled" to another component, there is no intervening component between these components. Other expressions that describe a relation between the components, such as "between ~" and "directly between ~" or "adjacent to" and "directly adjacent to" should be interpreted as well.

The terms used in the present specification are used only to describe the specific embodiments and are not intended to restrict the present disclosure. Unless the context clearly dictates otherwise, singular expressions include a plural meaning. It should be understood that, in this specification, the term "comprise" or "have" etc. specifies the presence of a stated feature, number, step, operation, component, element, or combination thereof described herein, but do not preclude the presence or addition of one or more other features, numbers, steps, operations, components, elements, or combinations thereof.

Unless otherwise defined, all terms used herein, including technical or scientific terms, have the same meaning as those commonly understood by one of ordinary skill in the art to which the present disclosure pertains. Terms such as those defined in commonly used dictionaries should be interpreted as having a meaning consistent with the meaning in the context of the relevant art and, unless expressly defined in the present application, should not be interpreted as an ideal or overly formal sense.

Hereinafter, the present disclosure is described in detail by describing preferred embodiments of the present disclosure with reference to the accompanying drawings. Same reference numerals shown in the respective drawings indicate the same members.

FIG. 2 is a view illustrating an exhaust gas purifying apparatus of a vehicle to which a fastening device according to one embodiment of the present disclosure is not coupled.

The exhaust gas purifying apparatus of a vehicle according to one embodiment of the present disclosure may include a turbine 100 constituting a turbocharger and configured to be rotated by flowing exhaust gas discharged from an engine into an inlet thereof; a filter 200 configured to be connected to an outlet of the turbine 100 at an inlet thereof and to allow the exhaust gas passing through the turbine 100 to flow thereinto; and a gasket 300 provided between the outlet of the turbine 100 and the inlet of the filter 200 to maintain airtightness between the turbine 100 and the filter 200. Here, a portion of the gasket 300 is exposed to the turbine 100 side or the filter 200 side.

The turbocharger is a supercharger that is driven by the exhaust gas of the engine and supercharges air to the engine. The turbocharger is a device formed by combining a compressor and the turbine 100. The turbocharger changes and collects energy of the exhaust bas, that has been discharged into the atmosphere, using a rotational force of the turbine 100 provided in an exhaust gas passage, improves a filling efficiency of mixed gas using the compressor provided at an intake port, and enhances an output and a fuel ratio.

The inlet of the turbine 100 of the turbocharger is connected to an outlet of the engine to absorb energy of the exhaust gas discharged from the engine and obtain a rotational force. In addition, the outlet of the turbine 100 is connected to the inlet of the filter 200 to allow the exhaust gas passing through the turbine 100 flow into the filter 200.

The filter 200 is a post-treatment device for reducing environmental pollutants contained in the exhaust gas, and may include all of a diesel oxidation catalyst (DOC), a diesel particulate filter (DPF), a selective catalyst reduction (SCR) device, and the like. A catalyst may be contained in the filter 200 to reduce pollutants.

The gasket 300 is a thin piece of packing material used to maintain airtightness of a coupling surface at a pipe flange joint and the like. Suitable material may be employed as material for the gasket 300 depending on the use and conditions. In a low-temperature and low-pressure environment, paper, synthetic resin, hemp, rubber, asbestos, leather may be used for the gasket, and cooper, lead, mild steel, and so forth may be employed in a high-temperature and low-pressure condition.

The gasket 300 is provided between the outlet of the turbine 100 and the inlet of the filter 200 to maintain airtightness between the turbine 100 and the filter 200. That is, the gasket maintains airtightness so as to prevent the exhaust gas discharged from the turbine 100 to the filter 200 from being leaked to the outside.

By placing the gasket 300 between the outlet of the turbine 100 and the inlet of the filter 200, the gasket is not exposed by the outlet of the turbine 100 and the inlet of the filter 200 when viewed from the turbine 100 side or from the filter 200 side.

In the present disclosure, however, a portion of the gasket 300 is exposed to the outside when viewed from the turbine 100 side or the filter 200 side, so that it is possible to determine whether the gasket 300 exists. A presence or absence of the gasket 300 may be visually determined when the gasket is visually recognized, but it can be determined whether the gasket 300 exists by means of a vision camera or the like.

According to a position of the vision camera, an exposed portion of the gasket 300 may be the turbine 100 side or the filter 200 side. That is, when the vision camera photographs from the turbine 100 side, a portion of the gasket 300 may be exposed to the turbine 100 side. On the contrary, when the vision camera photographs from the filter 200 side, a portion of the gasket 300 may be exposed to the filter 200 side.

Accordingly, after the turbine 100 and the filter 200 are coupled to each other, it is possible to determine whether the gasket 300 is positioned between the turbine 100 and the filter 200 using a naked eye or the vision camera, and as a result, an absence of the gasket 300 can be prevented to prevent the exhaust gas from being leaked.

Flanges 110 and 210 are formed at the outlet of the turbine 100 and the inlet of the filter 200, respectively, and the flange 110 of the turbine 100 and the flange 210 of the filter 200 are connected to each other. In addition, one of the flange 110 of the turbine 100 and the flange 210 of the filter 200 may be formed to have an indentation part 500, which is obtained by forming a portion of one of the flanges 110 and 210 to be concave towards an inner side thereof. Therefore, a portion of the gasket 300 is exposed through this indentation part. The flange 110 is formed at the outlet of the turbine 100 and the flange 210 is formed at the inlet of the filter 200, and the flange 110 of the turbine 100 and the flange 210 of the filter 200 may be coupled to each other with the gasket 300 being interposed therebetween.

FIG. 3 is a perspective view showing a state in which the flange of the turbine and the flange of the filter according to one embodiment of the present disclosure are coupled to each other.

Referring to FIG. 3, a portion of one of the flange 110 of the turbine 100 and the flange 210 of the filter 200 is concave inward, so that a portion of the gasket 300 may be exposed to the outside. That is, by removing inward a portion of the outer portion of one of the flanges using a cutting method or the like, the indentation part 500 which is concave inward is formed on a portion of an outer portion of one of the flange 110 of the turbine 100 and the flange 210 of the filter 200, so that a portion of the gasket 300 may be exposed to the turbine 100 side or the filter 200 side.

FIG. 3 shows that the vision camera is located on a side of the filter 200 having a relatively small outer diameter, the indentation part 500 is formed on the flange 210 of the filter 200 so that a portion of the gasket 300 is exposed when viewed from the filter 200 side.

FIG. 4 is a plane view of the gasket according to one embodiment of the present disclosure, and FIG. 5 is a cross sectional view taken along line A-A in FIG. 4.

Referring to FIGS. 4 to 5, a region 310 of one face of the gasket 300, which is in contact with the flange having the indentation part 500 formed thereon and being one of the flange 110 of the turbine 100 and the flange 210 of the filter 200, may be painted. Specifically, when the flange 110 of the turbine 100 has the indentation part formed by removing inward a portion thereof, one face of the gasket 300 corresponding to the turbine 100 may be painted, and when the flange 210 of the filter 200 has the indentation part formed by removing inward a portion thereof, one face corresponding the filter 200 may be painted.

The region 310 of one face of the gasket 300 may be painted with a color that can be easily identified (for example, red color), and may be painted with a color which can be distinguished from surrounding parts and easily recognized by the vision camera.

The gasket 300 is a member provided for the purpose of maintaining airtightness, and in order to have a minimal impact on tightness, the outermost portion of the gasket 300 may be painted and a minimum region may be painted.

Particularly, the painted region 310 of the gasket 300 may have a width at an edge of the gasket 300, that is equal to or greater than a depth of the indentation part 500 formed on the flange 110 of the turbine 100 or the flange 210 of the filter 200. Specifically, since the region of the gasket 300 exposed to the outside and corresponding to the indentation part 500 formed on the flange 110 of the turbine 100 or the flange 210 of the filter 200 needs to be painted, a circumferential band region having a width from an edge of the basket 300, that is equal to or greater than the depth of the indentation part 500 formed on the flange 110 of the turbine 100 or the flange 210 of the filter 200, may be painted.

In addition, the painted region 310 of the gasket 300 may have a width equal to or greater than that of the indentation part 500 formed on the flange 110 of the turbine 100 or the flange 210 of the filter 200, may have a width equal to or greater than that of a gap 430 of a fastening device 400 described later.

FIG. 6 is a view illustrating the exhaust gas purifying apparatus of a vehicle to which the fastening device according to one embodiment of the present disclosure is coupled, and FIG. 7 is an enlarged view of the fastening device according to one embodiment of the present disclosure.

Referring to FIGS. 6 and 7, the exhaust gas purifying apparatus of the present disclosure may further include the fastening device 400 having a shape wrapping the outlet of the turbine 100, the inlet of the filter 200 and only a portion of the gasket 300 between the turbine and the filter and to fasten the turbine 100 and the filter 200. The fastening device 400 may couple the outlet of the turbine 100 and the inlet of the filter 200 to each other while wrapping all of the flange 110 formed at the outlet of the turbine 100, the flange 210 formed at the inlet of the filter 200 and the gasket 300 disposed between the flange 110 of the turbine 100 and the flange 210 of the filter 200 at a side face.

The fastening device 400 may be a cylindrical clamp that fixes the flange 110 of the turbine 100 and the flange 210 of the filter 200 on a side face. Due to the fastening device 400 which wraps the flange 110 of the turbine 110 and the flange 210 of the filter 200 at a side face and couples both flanges to each other, it is more difficult to confirm whether the gasket 300 exists.

In particular, the fastening device 400 includes a first part 410 covering a portion of the outlet of the turbine 100 and the inlet of the filter 200 and a second part 420 covering the other portion of the outlet of the turbine 100 and the inlet of the filter 200. Here, the first part 410 and the second part 420 may be coupled to each other so that the gap 430 through which the outlet of the turbine 110 and the inlet of the filter 200 are exposed to the outside is formed between the first part and the second part.

By forming the gap 430 between the first part 410 and the second part 420 and by narrowing the gap 430 as much as possible at the sides of the flange 110 of the turbine 100 and the flange 210 of the filter 200, the fastening device 400 may be tightly coupled. To this end, a bolt 440 is fastened at the gap 460 between the first part 410 and the second part 420 to couple the first and second parts and is then screw-coupled to the first and second parts to narrow the gap 430 between the first part 410 and the second part 420. As a result, the fastening device 400 may be coupled.

The fastening device 400 may be fixed to allow the gap 430 to be placed on a portion of the gasket 300 exposed to the turbine 100 side or the filter 200 side. Since the fastening device 400 wraps the flange 110 of the turbine 100 and the flange 210 of the filter 200 at a side face, when the fastening device 400 is fastened, the presence or absence of the gasket 300 cannot be confirmed.

However, when a portion of the gasket 300 exposed to the turbine 100 side or the filter 200 side is positioned on the gap 430 of the fastening device 400, it is possible to confirm whether the gasket 300 exists. Accordingly, the fastening device 400 should be fixedly coupled so that the gap 430 is positioned on a portion of the gasket 300 exposed to the turbine 100 side of the filter 200 side.

Specifically, a fixing means for fixing a position of the fastening device 400 may be provided on the turbine 100 or the filter 200 and the fastening device 400 (see FIG. 6). It is not necessary to tightly couple the turbine 100 or the filter 200 and the fastening device 400 to each other by means of the fixing means, and it is sufficient for the fastening device 400 to be fixed so as not to be further relatively rotated to one side by the fixing means.

As one embodiment, the fixing means may include a first protrusion 220 formed to protrude outward from the turbine 100 or the filter 200 and a second protrusion 450 formed to protrude from the fastening device 400 towards the turbine 100 or the filter 200. Here, the first protrusion 220 the second protrusion 450 may be engaged with and coupled to each other.

Since the fastening device 400 wraps the flange 110 of the turbine 100 and the flange 210 of the filter 200 on an outer side, the second protrusion 450 may protrude from the outer side of the flange 110 of the turbine 110 and the flange 210 of the filter 200 to the turbine 100 side or the filter 200 side. The first protrusion 220 may protrude outward from the turbine 100 or the filter 200 to have a height so as to allow the second protrusion 450 to be engaged therewith.

Therefore, the second protrusion 450 formed on the fastening device 400 is engaged with and coupled to the first protrusion 220 fixed to the turbine 100 or the filter 200 to prevent a relative rotation, and two protrusions are coupled to each other at this position to allow the fastening device 400 to be fixed so that the gap 430 of the fastening device may be positioned on a portion of the gasket 300 exposed to the turbine 100 side and the filter 200 side.

According to the exhaust gas purifying apparatus of the present disclosure, there is an advantage that even after the parts are coupled, it is possible to determine whether the gasket exposed between the clamps exists.

Further, it is possible to solve the problem of a leakage of the exhaust gas which can be caused by the absence of the gasket, and the quality problem of fire or the like due to a leakage of the exhaust gas can be prevented.

Although the specific embodiments of the present disclosure have been illustrated and described, it will be apparent to those skilled in the art that the present disclosure may be variously modified and changed without departing from the technical spirit of the present disclosure as disclosed in the accompanying claims.

What is claimed is:

1. An exhaust gas purifying apparatus for a vehicle comprising:
   a turbocharger having a turbine which rotates by exhaust gas flowing from an engine into an inlet of the turbine;
   a filter connected to an outlet of the turbine at an inlet of the filter and allowing the exhaust gas passing through the turbine to flow into the filter; and
   a gasket disposed between the outlet of the turbine and the inlet of the filter to maintain airtightness between the turbine and the filter,
   wherein a portion of the gasket is exposed toward the turbine or toward the filter.

2. The exhaust gas purifying apparatus of claim 1, wherein the outlet of the turbine and the inlet of the filter have first and second flanges, respectively, which are connected to each other,
   wherein one of the first and second flanges has an indentation part, which is concaved toward an inner side of the one of the first and second flanges, such that a portion of the gasket is exposed outside.

3. The exhaust gas purifying apparatus of claim 2, wherein a region of one face of the gasket, which is in contact with the one of the first and second flanges having the indentation part, is painted.

4. The exhaust gas purifying apparatus of claim 3, wherein the painted region of the gasket has a width at an edge of the gasket to be equal to or greater than a depth of the indentation part on one of the first and second flanges.

5. The exhaust gas purifying apparatus of claim 1, further comprising a fastening device wrapping the outlet of the turbine, the inlet of the filter, and a portion of the gasket between the turbine and the filter,
   wherein the fastening device fastens the turbine and the filter.

6. The exhaust gas purifying apparatus of claim 5, wherein the fastening device comprises:
   a first part covering a portion of the outlet of the turbine and the inlet of the filter; and
   a second part covering another portion of the outlet of the turbine and the inlet of the filter, and
   wherein the first part and the second part are coupled to each other to have a gap, through which the outlet of the turbine and the inlet of the filter are exposed to outside, between the first part and the second part.

7. The exhaust gas purifying apparatus of claim 6, wherein the fastening device is fixed to allow the gap to be located at a portion of the gasket, which is exposed toward the turbine or the filter.

8. The exhaust gas purifying apparatus of claim 6, wherein the fastening device and one of the turbine and the filter have fixing units, respectively, to fix a position of the fastening device.

9. The exhaust gas purifying apparatus of claim 8, wherein the fixing unit comprises:
   a first protrusion protruding outward from one of the turbine and the filter; and
   a second protrusion protruding from the fastening device toward one of the turbine and the filter, wherein the first protrusion and the second protrusion are engaged with and coupled to each other.

\* \* \* \* \*